I. Van Doren,
Converting Motion.
No. 19,726.          Patented Mar. 23, 1858.
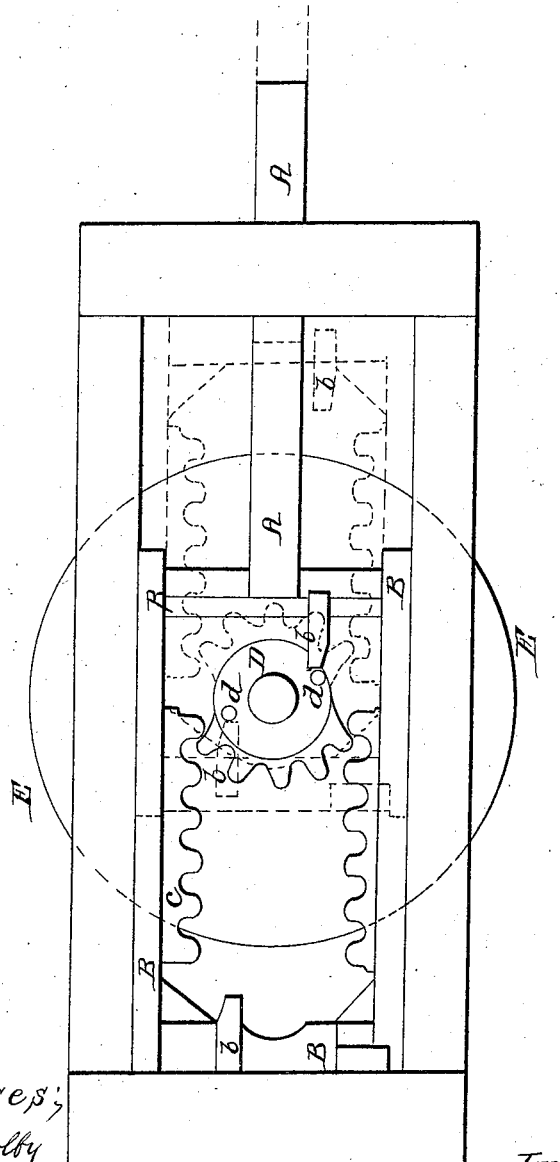
Witnesses;
Hall Colby
L. D. Law
Inventor;
Isaac Van Doren

UNITED STATES PATENT OFFICE.

ISAAC VAN DOREN, OF SOMERVILLE, NEW JERSEY.

IMPROVEMENT IN RECIPROCATING AND ROTARY MOTION.

Specification forming part of Letters Patent No. 19,726, dated March 23, 1858.

*To all whom it may concern:*

Be it known that I, ISAAC VAN DOREN, of Somerville, Somerset county, and State of New Jersey, have invented a new and Improved Manner of Converting Reciprocatory Motion into Rotary Motion; and I do hereby declare that the following is a full, clear, and exact description thereof, reference being had to the accompanying drawing, and to the letters of reference marked thereon, making a part of this specification.

In the drawing the heavy lines represent the different parts in one position and the dotted lines in another or the reverse position.

To the piston-rod A is fixed a framing B B, upon the sides of which is attached the gearing C C. Such gearing, as the piston is moved backward and forward, acts upon the partially-geared wheel D, which is fixed to and moves the wheel or drum E. The center geared wheel D is geared only a part of its circumference, and less than one-half of such circumference, so that when it is thrown into gear with the gearing on one side of the part B it will pass from out of gear with the other side, and thus no interference or hinderance be offered to its continued action or revolutions. In order, however, to secure such action—that is, have the geared wheel D entirely thrown out of gear with one side of the frame B before or at the time it is thrown into gear with the other side—it is necessary that the gearing on the wheel D should be so much less than one-half of its circumference that, except for some arrangement or contrivance to prevent such a result, it would fail by its own action of always being thrown into gear with one side and the other alternately. To prevent such a result and cause the wheel D to be constantly in full gear with one or the other side of the framing fixed to the piston, upon one or both sides of the wheel D is a pin or elevation $d$, which is so placed that the part or projection $b$ of the frame B will strike against it just before the piston reaches its full stroke, and at the time the wheel D is passing out of gear with the opposite side of B, and such projection $b$, pressing against the elevation $d$ during the balance of the stroke, carries the wheel D beyond what may be called its "dead-point" and throws it into gear with the opposite side of B, so as to be acted upon and rotated by the reverse motion of the piston. By this arrangement, in connection with such partially-geared wheel D, such wheel is kept constantly rotating while the piston A is reciprocating.

As will be at once apparent, in order to have the wheel D constantly rotate while the geared frame B constantly reciprocates, it is absolutely necessary that the gearing upon the wheel D should be in contact with but one side of the frame B at the same time, else the parts would be stopped or broken, and it is therefore, as before stated, necessary that the gearing upon D should be enough less than half its circumference to allow it to entirely pass from contact with one side before entering into gear with the other side. Such being necessary, the dead-point, so to speak, of the wheel D is to be overcome by momentum or by some mechanical arrangement which shall throw the wheel into gear alternately with one side and then the other of the frame B. This can be done and is effected by the point or elevation $d$ on the wheel D and the bar or projection $b$ on the frame B, and acting substantially as described.

I do not claim generally changing a reciprocating into a rotary motion, as this has been done in various ways.

I am aware that an arrangement somewhat similar to the projection and elevation $b$ and $d$ has been used, as in the patent of McLaughlin of 1848; but they were in combination with movable cogs, &c. I do not, therefore, claim generally changing reciprocating into rotary motion by means of the gearing B and rotating wheel A; but

What I claim as my invention, and desire to secure by Letters Patent, is—

The arrangement of the wheel D and its elevation $d$ and the gearing B and its projection $b$, as described, so that the wheel D shall be constantly rotated by the use of $d$ and $b$ alone without springs, sliding cogs, or any other mechanism.

ISAAC VAN DOREN.

Witnesses:
HALL OLBY,
S. D. LAW.